(12) United States Patent
Izumi et al.

(10) Patent No.: US 7,105,767 B2
(45) Date of Patent: Sep. 12, 2006

(54) FIXED TYPE ELECTRODE TIP REMOVAL DEVICE

(75) Inventors: Takehiro Izumi, Ayase (JP); Takashi Kanno, Ayase (JP); Kenji Hayafuji, Ayase (JP)

(73) Assignee: Obara Corporation, Ayase (JP)

( * ) Notice: Subject to any disclaimer, the term of this patent is extended or adjusted under 35 U.S.C. 154(b) by 45 days.

(21) Appl. No.: 10/895,537

(22) Filed: Jul. 21, 2004

(65) Prior Publication Data

US 2005/0016967 A1    Jan. 27, 2005

(30) Foreign Application Priority Data

Jul. 23, 2003    (JP)    ............................. 2003-278218

(51) Int. Cl.
*B23K 11/30*    (2006.01)

(52) U.S. Cl. .................................. 219/86.8; 219/86.25

(58) Field of Classification Search .................. 219/84, 219/86.25, 86.8, 119; 29/426.4
See application file for complete search history.

(56) References Cited

U.S. PATENT DOCUMENTS

| | | | | |
|---|---|---|---|---|
| 4,794,221 A | * | 12/1988 | Takabe et al. | ............. 219/86.8 |
| 5,495,663 A | * | 3/1996 | Saito | ............................ 29/762 |
| 5,767,474 A | * | 6/1998 | Shimada | .................... 219/86.8 |
| 6,188,038 B1 | * | 2/2001 | Kazuhiro | .................... 219/86.8 |
| 6,667,454 B1 | * | 12/2003 | Rigaux | ....................... 219/86.8 |

FOREIGN PATENT DOCUMENTS

JP    2001-347380    12/2001

* cited by examiner

*Primary Examiner*—Kevin Kerns
*Assistant Examiner*—Michael Aboagye
(74) *Attorney, Agent, or Firm*—Flynn, Thiel, Boutell & Tanis, P.C.

(57) ABSTRACT

There is provided a fixed type electrode tip removal device capable of reliably removing an electrode tip and realizing full automation of the removal device. The fixed type electrode tip removal device for removing an electrode tip from the shank is made up of a take-out claw member provided with a substantially semi-circular claw for being brought into contact with an end face of the shank and an end face of the electrode tip in a gap between a large diameter portion of the shank and the electrode tip, the take-out claw member being disposed at the tip end of the removal device, wherein the end face of the electrode tip is pressurized by the claw in the direction of an axis of the electrode tip to remove the electrode tip from the shank, the take-out claw member being made up of a fixed take-out claw member fixed to a base plate and a movable take-out claw member movable relative to the base plate, a driving unit fixed to the base plate, a wedge connected to a pressure application rod from the driving unit, the wedge having a flat face at one side and a tapered inclined face at the other side, and an inclined face formed on the movable take-out claw member contacting the inclined face of the wedge.

3 Claims, 5 Drawing Sheets

FIXED TYPE ELECTRODE TIP REMOVAL DEVICE

FIELD OF THE INVENTION

Invention relates to a device for removing a welding electrode tip (hereinafter referred simply to electrode tip) engaged on a taper-shaped shank (hereinafter referred to as taper-engaged) from the shank.

BACKGROUND OF THE INVENTION

There is a fixed type electrode tip removal device for removing an electrode tip taper-engaged on a shank from the shank, which is, for example, disclosed in Japanese utility model Laid Open Publication No. 2001-347380, wherein a take-out claw member provided with a substantially semi-circular claw which is brought into contact with an end face of the shank and an end face of the electrode tip in a gap between the large diameter portion of the shank and the electrode tip, and the take-out claw member is disposed at the tip end side of the removal device, and the end face of the electrode tip is pressurized in the direction of an axis of the electrode tip by the claw to remove the electrode tip from the shank.

Meanwhile, the prior art set forth above relates to a movable electrode tip removal device for removing an electrode tip by allowing the electrode tip removal device to approach a fixing portion of the electrode tip of a welder, and turning a handle of the electrode tip removal device up and down at a predetermined position to pressurize the tip end of the electrode tip in the direction of the axis thereof to remove the electrode tip. As a result, it takes time and labor for removing the electrode tip so that neither a labor savings nor full automation can be realized.

SUMMARY OF THE INVENTION

The invention has been made in view of the problems of the prior art and has an object of providing a fixed type electrode tip removal device, wherein the electrode tip to be removed is movably disposed, and the electrode tip is removed by a movable take-out claw member utilizing a wedge connected to a driving unit, thereby reliably removing the electrode tip and realizing full automation of the tip removal device.

To achieve the above object, the fixed type electrode tip removal device for removing an electrode tip taper-engaged on a shank from the shank according to the first aspect of the invention comprises a take-out claw member provided with a substantially semi-circular claw being brought into contact with an end face of the shank and an end face of the electrode tip in a gap between a large diameter portion of the shank and the electrode tip, the take-out claw member being disposed at the tip end of the removal device, characterized in that the end face of the electrode tip is pressurized by the claw in the direction of an axis of the electrode tip to remove the electrode tip from the shank, the take-out claw member comprising a fixed take-out claw member fixed to a base plate and a movable take-out claw member movable relative to the base plate, a driving unit fixed to the base plate, a wedge connected to a pressure application rod from the driving unit, the wedge having a flat face at one side and a tapered inclined face at the other side, and an inclined face formed on the movable take-out claw member contacting the inclined face of the wedge.

The fixed type electrode tip removal device according to the second aspect of the invention is characterized in that the take-out claw member is provided in two stages forming upper and lower stage take-out claw members, wherein the upper stage take-out claw member comprises a fixed take-out claw member provided at the upper portion and a movable take-out claw member provided at the lower portion, and a lower stage take-out claw member comprises a movable take-out claw member provided at the upper portion and a fixed take-out claw member provided at the lower portion, wherein upper and lower stage wedges are connected to the pressure application rod from the driving unit so that the wedges are operated at the same time relative to the movable take-out claw member of each stage.

The fixed type electrode tip removal device according to the third aspect of the invention is characterized in that there is provided a difference between tip end positions of upper and lower wedges to provide a phase difference in wedging operation relative to the movable take-out claw member of each stage.

PREFERRED EMBODIMENT OF THE INVENTION

A fixed type electrode tip removal device comprises a take-out claw member comprised of a fixed take-out claw member fixed to a base plate and a movable take-out claw member movable relative to the base plate, a driving unit fixed to the base plate, a wedge connected to a pressure application rod from the driving unit, an inclined face formed on the movable take-out claw member contacting the inclined face of the wedge, wherein a welder provided with an electrode tip to be removed is moved to drive the driving unit for pressurizing the movable take-out claw member toward an axis of the electrode tip in a sate where both claws of the take-out claw member are housed in a gap between the electrode tip and a shank, thereby removing the electrode tip from the shank by the movable take-out claw member.

The control for moving the welder until the welder provided with the electrode tip to be removed is moved to be positioned so that both claws of the take-out claw member are housed in the gap between the electrode tip and the shank or after the electrode tip is removed can be effected, for example, based on the control of a robot which is tuned in a control mechanism of the robot, and the control of the fixed type for both the claws of the take-out claw sensor which is disposed relative to the electrode tip at claw sides of the take-out claw member, thereby realizing a full automation of the fixed type electrode tip removal device.

First Embodiment

Figure 1:
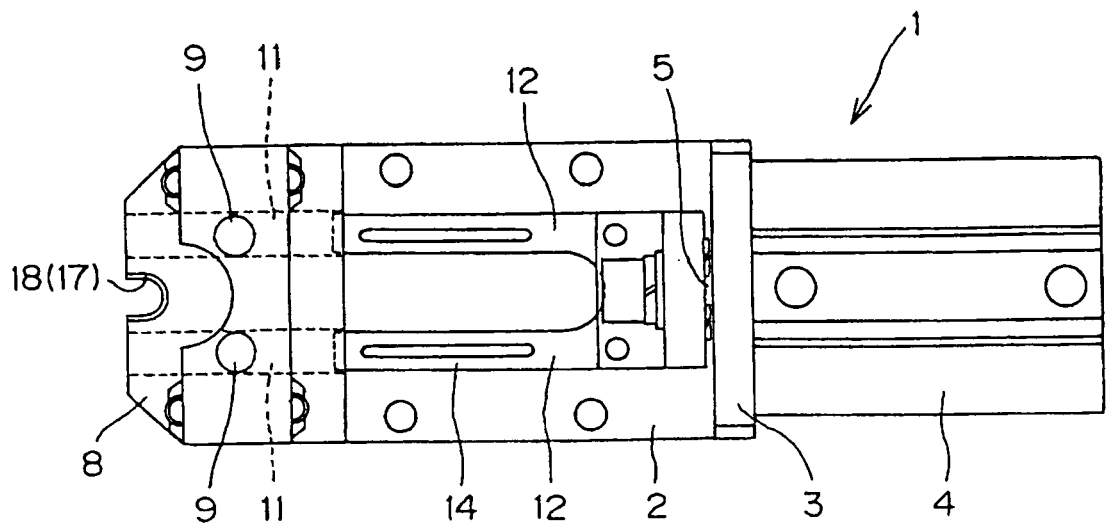
FIG. 1 is a plan view of a main portion of a fixed type electrode tip removal device according to a first embodiment of the invention.
Figure 2:
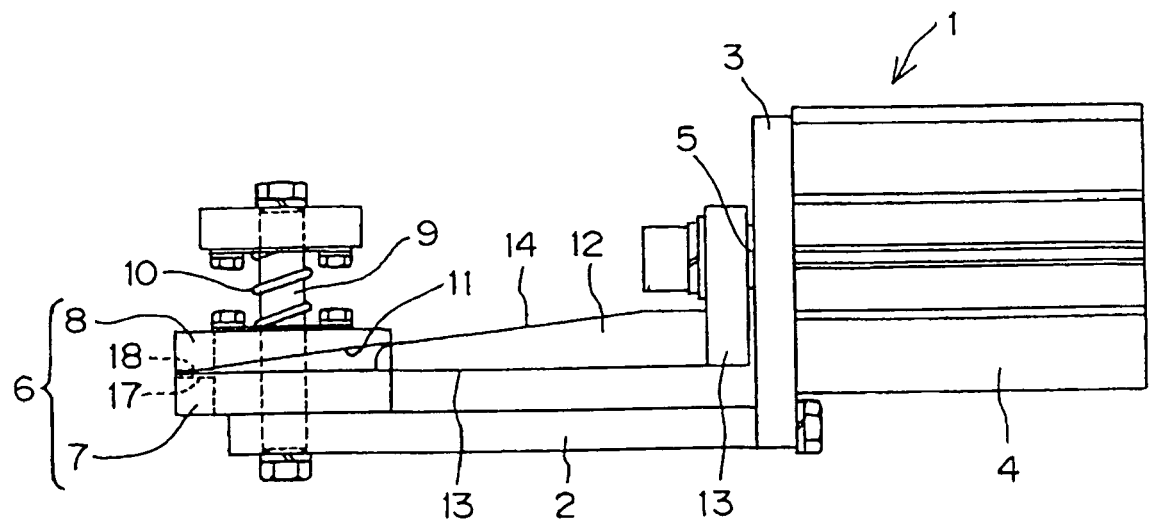
FIG. 2 is a front view of the fixed type electrode tip removal device shown in FIG. 1.
Figure 3:
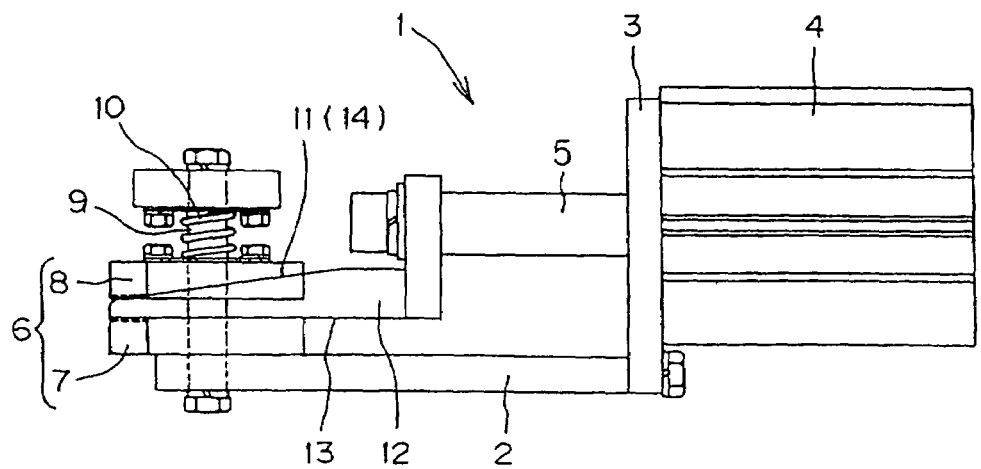
FIG. 3 is a view for explaining an operation of the fixed type electrode tip removal device shown in FIG. 1.
Figure 4:
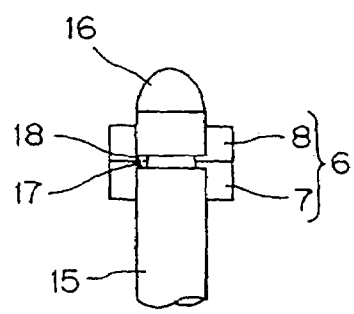
FIG. 4 is a view for explaining the disposition of an electrode tip relative to the fixed type electrode tip removal device shown in FIG. 1.

FIGS. 1 to 4 relate to a fixed type electrode tip removal device according the first embodiment of the invention, wherein FIG. 1 is a plan view of a main portion thereof, FIG. 2 is a front view thereof, FIG. 3 is a view for explaining an operation thereof, and FIG. 4 is a view for explaining the disposition of the electrode tip relative to the fixed type electrode tip removal device shown in FIG. 1.

In these figures, depicted by 1 is an entire fixed type electrode tip removal device, wherein a driving unit 4 is fixed to a base plate 2 of the electrode tip removal device 1 via a bracket 3. The driving unit 4 can suitably employ driving means such as reciprocating moving means of a pressure application rod 5, for example, by a well known air cylinder, reciprocating moving means of the pressure application rod 5 by a screw and a nut from a motor.

Depicted by 6 is a take-out claw member comprised of a fixed take-out claw member 7 fixed to the base plate 2 and a movable take-out claw member 8 movable relative to the base plate 2. The fixed take-out claw member 7 and movable take-out claw member 8 are skewered with two struts 9 which stand upright on the tip end sides of the base plate 2, wherein the fixed take-out claw member 7 is non-movable relative to the struts 9 while the movable take-out claw member 8 is slidably fixed to the struts 9, and the movable take-out claw member 8 is urged toward the fixed take-out claw member 7 to be brought into contact with the fixed take-out claw member 7 by a spring 10 which is wound around the struts 9. Further, an inclined face 11 is formed on the movable take-out claw member 8 at the side opposing the fixed take-out claw member 7 into which a wedge, described later, enters.

A base portion of the wedge 12 which is branched into two is fixed to the tip end portion of the pressure application rod 5 via connecting members 13. The wedge 12 has a flat face at one side (face contacting the face of the fixed take-out claw member 7) and a tapered inclined face 14 at the other side (face contacting the inclined face 11).

Substantially semi-circular claws 17, 18 which are brought into contact with the end face of the shank 15 and the end face of an electrode tip 16 are formed at the tip end centers of the fixed take-out claw member 7 and the movable take-out claw member 8 constituting the take-out claw member 6 in a gap between the large diameter portion of the shank 15 and the electrode tip 16.

In a state where the wedge 12 does not act against the take-out claw member 6 as shown in FIG. 2, the movable take-out claw member 8 is pressed toward the fixed take-out claw member 7 side by the spring 10 so that the claw 17 of the fixed take-out claw member 7 and the claw 18 of the movable take-out claw member 8 overlap vertically with each other.

In a sate where the electrode tip removal device 1 is positioned as shown in FIG. 2, a welder provided with the electrode tip 16 to be removed is moved, e.g. by a robot, from the left side in FIG. 2 toward the electrode tip removal device 1 so that both the claws 17 and 18 of the take-out claw member 6 are housed in a gap between the electrode tip 16 and the shank 15 as shown in FIG. 4.

If the wedge 12 is moved forward by moving the driving unit 4 via the pressure application rod 5 in this state, the horizontal face 13 of the wedge 12 slides on the upper face of the fixed take-out claw member 7 so that the inclined face 14 of the wedge 12 moves forward along the inclined face 11 formed on the movable take-out claw member 8, so that the movable take-out claw member 8 moves upward while guided by the struts 9 against an urging force of the spring 10 and moved away from the fixed take-out claw member 7.

When the movable take-out claw member 8 is moved away upward, the claw 17 of the fixed take-out claw member 7 is pressed under pressure and held by the end face of the shank 15 while the claw 18 of the movable take-out claw member 8 pressurizes the electrode tip 16 in the direction of the axis thereof while being brought into uniform contact with the end face of the electrode tip 16, resulting in that the electrode tip 16 is removed from the shank 15 by the movable take-out claw member 8. Since the movable take-out claw member 8 is guided by the struts 9 and moved upward with certainty, described above, when the electrode tip 16 is removed, the electrode tip 16 can be completely removed from the shank 15, even if there is slight damage or burrs on the electrode tip 16.

When the driving unit 4 is driven in a reverse direction in a state where the electrode tip 16 is removed from the shank 15 in such a manner, the wedge 12 is moved backward and the movable take-out claw member 8 is moved downward by the urging force of the springs 10 so that the electrode tip removal device 1 is returned to an original state as shown in FIGS. 1 and 2 and rendered to a standby state.

As mentioned above, the take-out claw member 6 comprises the fixed take-out claw member 7 which is fixed to the base plate 2 and the movable take-out claw member 8 which is movable relative to the base plate 2, and the driving unit 4 is fixed to the base plate 2, and further, the wedge 12 having the horizontal face 13 at one side and the inclined face 14 at the other side is connected to the pressure application rod 5 from the driving unit 4, and the inclined face 11 contacting the inclined face 14 of the wedge 12 is formed on the movable take-out claw member 8, so that the movable take-out claw member 8 is reliably operated by the wedge 12 driven by the driving unit 4, thereby forming the electrode tip removal device 1 capable of labor saving and being fully automated as a whole.

Second Embodiment

Figure 5:
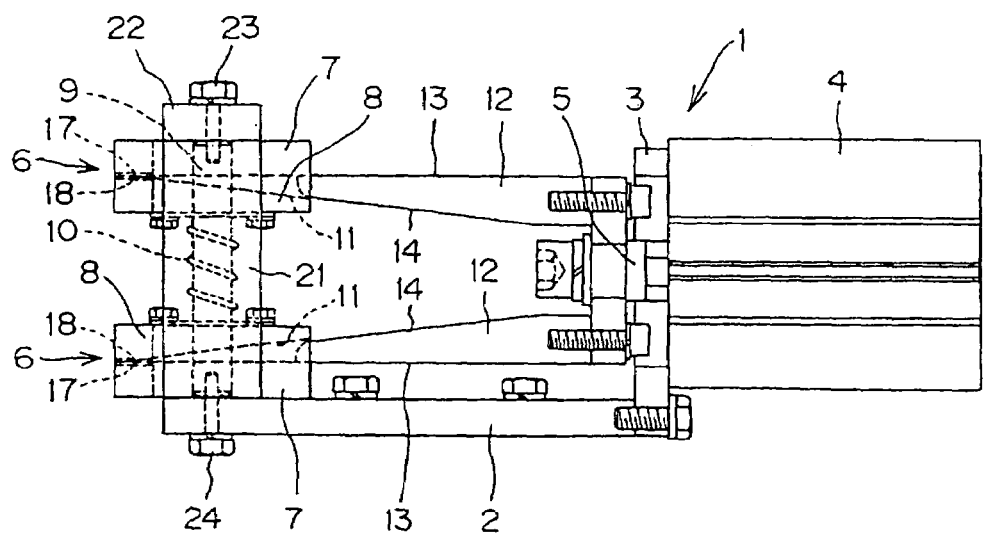
FIG. 5 is a front view of a main portion of a fixed type electrode tip removal device according to a second embodiment of the invention.
Figure 6:
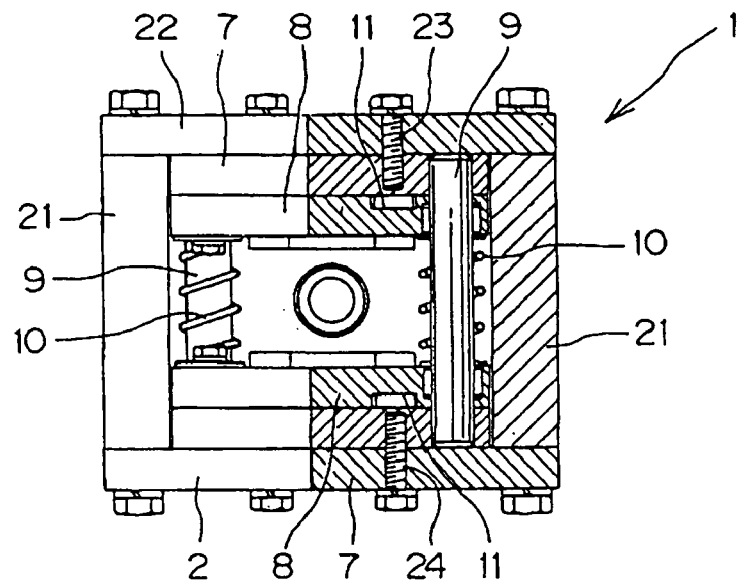
FIG. 6 is a left side view of the fixed type electrode tip removal device shown in FIG. 5 serving as a partial sectional view.
Figure 7:
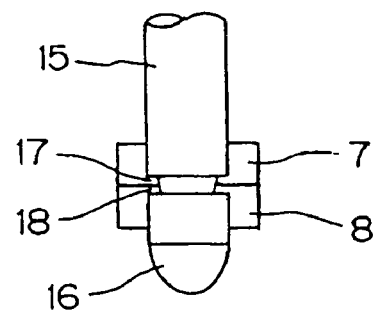
FIG. 7 is a view for explaining the disposition of electrode tips relative to the fixed type electrode tip removal device shown in FIG. 5.
Figure 7:
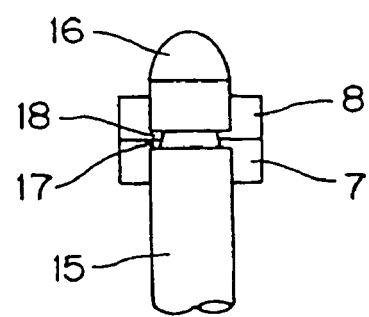

FIGS. 5 to 7 relate to a fixed type electrode tip removal device according the second embodiment of the invention, wherein FIG. 5 is a front view of a main portion thereof, FIG. 6 is a left side view thereof, and FIG. 7 is a view for explaining the disposition of the electrode tips relative to the fixed type electrode tip removal device shown in FIG. 5.

In the second embodiment, the take-out claw members 6 are provided at the upper and lower two stages and they can be operated at the same time by the wedge provided at the upper and lower two stages, which is different from the take-out claw member 6 of the first embodiment. Other components of the electrode tip removal device 1 are substantially the same as those of the first embodiment, and hence the same components are depicted by the same reference numerals and the explanation thereof is omitted.

That is, the take-out claw members 6 are provided at the upper and lower two stages wherein the upper stage take-out claw member 6 comprises a fixed take-out claw member 7 positioned at the upper portion and the movable take-out claw member 8 positioned at the lower portion while the lower stage take-out claw member 6 comprises a movable take-out claw member 8 positioned at the upper portion and a fixed take-out claw member 7 positioned at the lower portion. The upper stage fixed take-out claw member 7 is fixed to a fixing plate 22 disposed at the upper end sides of two struts 21 which stand upright at the tip end side of the base plate 2 by bolts 23 while the lower stage fixed take-out claw member 7 is fixed directly to the tip end side of the base plate 2 by bolts 24. Two spring holding struts 9, 9 which penetrate the upper and lower stage movable take-out claw members 8, 8 are provided to stand upright between the upper and lower stage fixed take-out claw members 7, 7, and springs 10, 10 are urged between the upper and lower stage movable take-out claw members 8, 8 of the struts 9, 9 so as to allow the upper and lower stage movable take-out claw members 8, 8 to be brought into contact under pressure with the fixed take-out claw members 7, 7.

Upper and lower two stage wedges 12, 12 are connected to a pressure application rod 5 from a driving unit 4 wherein the upper stage wedge 12 has an inclined face 14 at the lower side while the lower stage wedge 12 has an inclined face 14 at the upper side so that the wedges 12, 12 are operated at the same time against the upper and lower stage movable take-out claw members 8, 8.

Accordingly, a welder provided with upper and lower electrode tips 16, 16 to be removed is moved from the left side in FIG. 5 toward the electrode tip removal device 1 while both claws 17, 18 of the take-out claw members 6, 6 are housed in a gap between the electrode tips 16, 16 and shanks 15, 15 as shown in FIG. 7. When the driving unit 4 is driven in this state to move the wedge 12 forward, horizontal faces 13 of the wedges 12, 12 slide on the upper faces of the fixed take-out claw members 7, 7 and both the inclined faces 14 of the wedges 12, 12 move forward along inclined faces 11 formed on the movable take-out claw members 8, 8 so that the movable take-out claw members 8, 8 are moved against the urging force of the springs 10, 10 to move away from the fixed take-out claw members 7, 7. When the movable take-out claw members 8, 8 are moved away from the fixed take-out claw members 7, 7, the claws 17 of the fixed take-out claw members 7, 7 are brought into contact under pressure with and held by the end faces of the shanks 15, 15 while the claws 18 of the movable take-out claw members 8, 8 are equally brought into contact with the end faces of electrode tips 16, 16 to pressurize the electrode tips 16, 16 in the direction of the axes thereof so that the upper and lower electrode tips 16, 16 are removed at the same time from the shanks 15, 15 by the movable take-out claw members 8, 8.

As mentioned above, since the take-out claw members 6 are provided at the upper and lower two stages wherein the upper stage take-out claw member 6 comprises the fixed take-out claw member 7 positioned at the upper portion and the movable take-out claw member 8 positioned at the lower stage while the lower take-out claw member 6 comprises the movable take-out claw member 8 positioned at the upper portion and the fixed take-out claw member 7 positioned at the lower portion, and further the wedges 12 provided at the upper and lower two stages are connected to the pressure application rod 5 from the driving unit 4, thereby forming the electrode tip removal device 1 capable of removing the two electrode tips 16, 16 which are disposed oppositely to the welder at the same time when the wedges 12, 12 are operated at the same time toward the movable take-out claw members 8, 8, resulting in quick removing operation of the electrode tips 16, 16.

Third Embodiment

Figure 8:
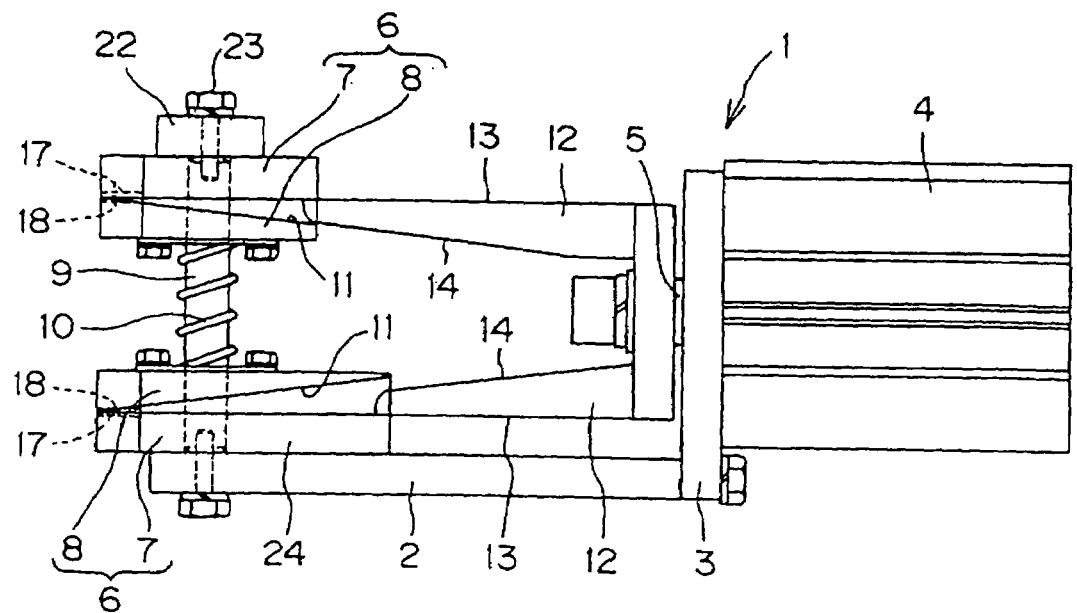
FIG. 8 is a plan view of a main portion of a fixed type electrode tip removal device according to a third embodiment of the invention.
Figure 9:
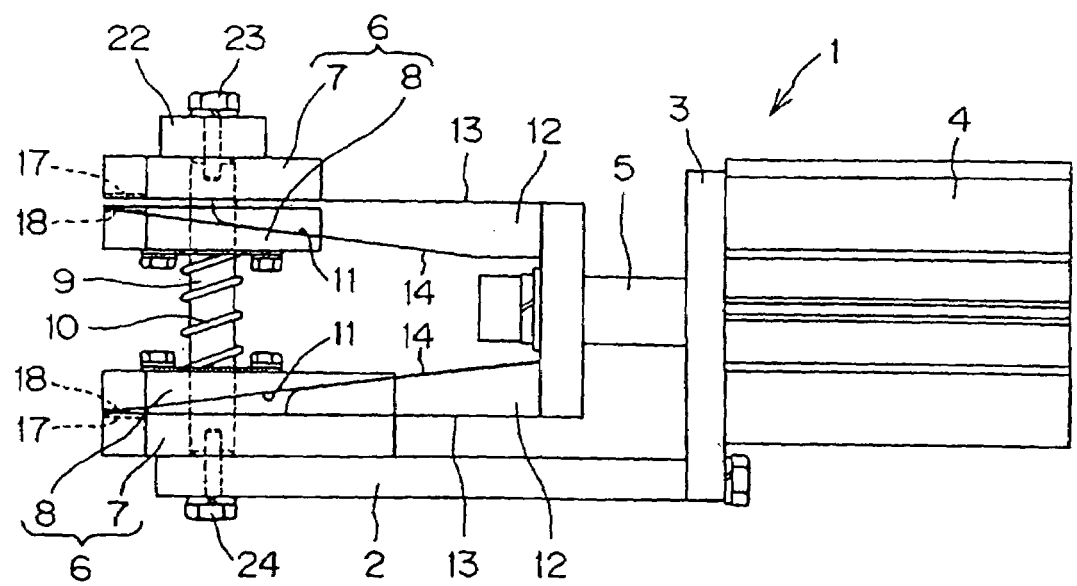
FIG. 9 is a view for explaining an operation of the fixed type electrode tip removal device shown in FIG. 8.
Figure 10:
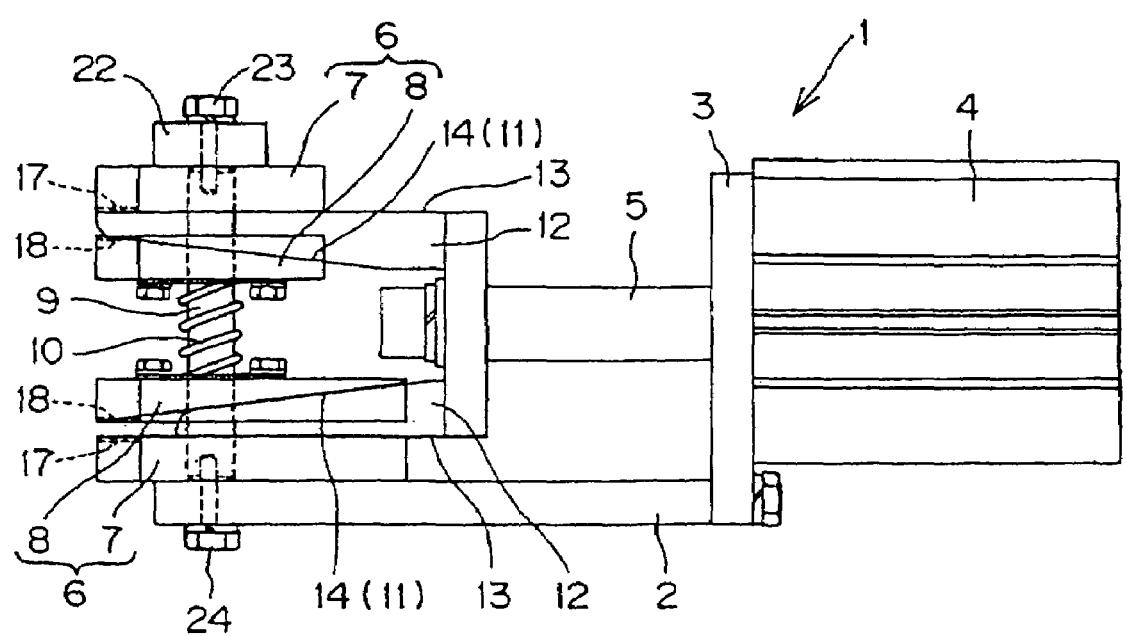
FIG. 10 is a view for explaining an operation of the fixed type electrode tip removal device shown in FIG. 8.

FIGS. 8 to 10 relate to a fixed type electrode tip removal device according the third embodiment of the invention, wherein FIG. 8 is a front view of a main portion thereof, and FIGS. 9 and 10 views for explaining operations thereof.

In the third embodiment, there is a difference between tip end positions of upper and lower wedges, and there is a phase difference in wedging operation relative to a movable take-out claw member of each stage, which is different from the second embodiment. Other components of the electrode tip removal device 1 are substantially the same as those of the second embodiment, and hence the same components are depicted by the same reference numerals and the explanation thereof is omitted.

That is, in the wedges 12, 12 disposed at the upper and lower two stages, the upper stage wedge 12 has an inclined face 14 at the lower side and a tapered tip end position thereof is located at the portion relatively close to a take-out claw member 6 while the lower stage wedge 12 has an inclined face 14 at an upper side and a tapered tip end position thereof is located at the portion relatively remote from the take-out claw member 6, thereby providing a phase difference in the wedging operation relative to the movable take-out claw members 8, 8 of each stage.

Accordingly, a welder provided with upper and lower electrode tips to be removed is moved from the left side in FIG. 8 toward the electrode tip removal device 1 so that claws 17, 18 of the take-out claw members 6, 6 are housed in each gap between the electrode tip and shank. When the driving unit 4 is moved in this state, the upper and lower wedges 12, 12 are moved forward at the same time, wherein the upper stage wedge 12 acts against the upper stage movable take-out claw member 8 to move the movable take-out claw member 8 against the urging force of a spring 10 so that the upper stage movable take-out claw member 8 is moved away from the upper stage fixed take-out claw member 7. When the upper stage movable take-out claw member 8 is moved away from the upper stage fixed take-out claw member 7, the claw 17 of the upper stage fixed take-out claw member 7 is brought into contact under pressure with and held by the end face of the upper shank while the claw 18 of the upper stage movable take-out claw member 8 is uniformly brought into contact with the end face of the electrode tip to pressurize the electrode tip in the direction of the axis thereof while the upper stage electrode tip is removed from the shank by the upper stage movable take-out claw member 8. At the time when this operation is completed, the lower stage wedge 12 acts against the lower stage movable take-out claw member 8 so that the lower stage movable take-out claw member 8 is moved away from the lower stage fixed take-out claw member 7. When the upper stage movable take-out claw member 8 is moved away from the lower stage fixed take-out claw member 7, the lower stage electrode tip is removed from the lower stage shank by the lower stage movable take-out claw member 8.

As mentioned above, in the case where there is a phase difference in the wedging operation relative to the movable take-out claw member 8, 8 by providing a difference in tip end positions of the upper and lower wedges 12, 12, there is a time lag in removing two electrode tips which are disposed oppositely to the welder, thereby providing the electrode tip removal device 1 with the ability to reduce the size of the driving unit so as to render the electrode tip removal device 1 small-sized.

According to the invention, the take-out claw member comprises the fixed take-out claw member fixed to the base plate and the movable take-out claw member movable relative to the base plate, the driving unit is fixed to the base plate, the wedge, having a horizontal face at one side and tapered inclined face at the other side, is connected to the pressure application rod of the driving unit, and the inclined face is provided on the movable take-out claw member connected to the incline of the wedge, thereby forming the electrode tip removal device which is capable of removing the electrode tip while the movable take-out claw member is reliably operated by the wedge driven by the driving unit to take out the electrode tip reliably, and capable of labor saving and being fully automated as a whole.

Further, since the take-out claw member is provided in two stages forming upper and lower stage take-out claw members, wherein the upper stage take-out claw member comprises the fixed take-out claw member provided at the upper portion and the movable take-out claw member provided at the lower portion, and the lower stage take-out claw member comprises the movable take-out claw member provided at the upper portion and the fixed take-out claw member provided at the lower portion, wherein the upper and lower stage wedges are connected to the pressure application rod from the driving unit so that the wedges are operated at the same time relative to the movable take-out claw member of each stage, so that an electrode tip removal device capable of removing two electrode tips disposed oppositely to the welder at the same time is formed, thereby quickly removing the electrode tips.

Still further, since there is provided the difference between tip end positions of the upper and lower wedgesto provide the phase difference in wedging operation relative to the movable take-out claw member of each stage, there is a time lag in removing the two electrode tips which are disposed oppositely to the welder, so that an electrode tip removal device capable of reducing the size of the driving unit is formed, thereby allowing the electrode tip removal device to be small-sized.

The disclosure of Japanese Patent Application No. 2003-278218 specification, claims, and drawings, is incorporated herein by reference.

What is claimed is:

1. A fixed electrode tip removal device for removing an electrode tip from a shank, comprising:
    a take-out claw member comprising substantially semi-circular claws for contacting with an end face of the shank and an end face of the electrode tip at a gap between a large diameter portion of the shank and the electrode tip, the semi-circular claws comprising a fixed take-out claw member fixedly attached to a base plate and a movable take-out claw member which has an inclined face and is movable relative to the base plate, the take-out claw member being disposed at the end of the removal device and the end face of the electrode tip is forced in its axial direction by the movable claw member to remove the electrode tip from the shank;
    springs provided around struts which extend vertically from the base plate for biasing the movable take-out claw member towards the fixed take-out claw member;
    a driving unit fixed to the base plate, said driving unit comprising a pressure application rod which moves towards and away from the take-out claw member; and
    a wedge connected to the pressure application rod and provided between the fixed take-out claw member and the movable take-out claw member, said wedge having a straight face which is in contact with a straight face of the fixed take-out claw member and an inclined face which is in contact with the inclined face of the movable take-out claw member.

2. A fixed electrode tip removal device for removing upper and lower electrode tips from a shank, comprising:
    an upper stage take-out claw member comprising an upper fixed take-out claw member provided at an upper position and an upper movable take-out claw member provided at a lower position, said upper fixed and movable take-out claw members comprising substantially semi-circular claws for contacting with an end face of the shank and a lower end face of the upper electrode tip at a gap between a large diameter portion of the shank and the upper electrode tip;
    an upper wedge provided between the upper fixed take-out claw member and the upper movable take-out claw member, the upper wedge having a straight face in contact with a straight face of the upper fixed take-out claw member and an inclined face in contact with an inclined face of the upper movable take-out claw member;
    a lower stage take-out claw member comprising a lower fixed take-out claw member provided at a lower position and a lower movable take-out claw member provided at an upper position, said lower fixed and movable take-out claw members comprising substantially semi-circular claws for contacting with an end face of the shank and a lower end face of the lower electrode tip at a gap between the large diameter portion of the shank and the lower electrode tip;
    a lower wedge provided between the lower fixed take-out claw member and the lower movable take-out claw member, the lower wedge having a straight face in contact with a straight face of the lower fixed take-out claw member and an inclined face in contact with an inclined face of the lower movable take-out claw member;
    springs provided around struts which extend vertically from a base plate for biasing the movable take-out claw members toward the fixed take-out claw members; and
    a driving unit comprising a pressure application rod for moving the wedges towards and away from the take-out claw members.

3. A fixed electrode tip removal device according to claim 2, wherein there is provided a difference between tip end positions of the upper and lower wedges to provide a phase difference in wedging operation relative to the upper and lower movable take-out claw members.

* * * * *